United States Patent [19]
Luong

[11] Patent Number: 6,108,405
[45] Date of Patent: Aug. 22, 2000

[54] HANDLING INCOMING DATA/FACSIMILE TRANSMISSIONS AND VOICE CALLS IN A COMPUTER/TELEPHONY INTEGRATED SYSTEM

[75] Inventor: Barry Luong, Garden Grove, Calif.

[73] Assignee: Ericsson Inc., Research Triangle Park, N.C.

[21] Appl. No.: 09/160,628

[22] Filed: Sep. 24, 1998

[51] Int. Cl.[7] .................................................. H04M 11/00
[52] U.S. Cl. .................................... 379/93.11; 379/93.09; 379/100.15
[58] Field of Search ............................. 379/93.11, 93.09, 379/100.15, 100.16; 455/462, 455

[56] References Cited

U.S. PATENT DOCUMENTS

| | | | |
|---|---|---|---|
| 5,471,522 | 11/1995 | Sells et al. ............................. | 379/93.11 |
| 5,642,410 | 6/1997 | Walsh et al. ............................. | 379/201 |
| 5,655,014 | 8/1997 | Walsh et al. ............................. | 379/201 |
| 5,655,015 | 8/1997 | Walsh et al. ............................. | 379/201 |

*Primary Examiner*—Curtis A. Kuntz
*Assistant Examiner*—Melur Ramakrishnaiah
*Attorney, Agent, or Firm*—Jenkens & Gilchrist

[57] ABSTRACT

A system, method, and apparatus for accepting an incoming call in a Computer/Telephony Integrated System wherein the incoming call is received by both a base station and a computer. A determination is made whether the incoming call is a voice call or a data or facsimile transmission. If the incoming call is a data or facsimile transmission, the incoming call is accepted by an application program running on the computer. If the incoming call is a voice call, the incoming call is accepted by the base station.

18 Claims, 4 Drawing Sheets

HANDLING INCOMING DATA/FACSIMILE TRANSMISSIONS AND VOICE CALLS IN A COMPUTER/TELEPHONY INTEGRATED SYSTEM

BACKGROUND OF THE INVENTION

1. Technical Field of the Invention

The present invention relates to receiving of an incoming call at a Computer/Telephony Integrated System and more particularly to determining whether the incoming call is a data or facsimile transmission or a voice call.

2. Description of Related Art

Computer/Telephony integration is a technology that integrates computers with the telephone network. With computer/telephony integration, a computer can take advantage of a wide range of sophisticated data communications features and services over the telephone line, such as sending or receiving a facsimile, surfing the Internet, or engaging in a chat session.

Data and facsimile transmissions are usually handled by the computer. The data and facsimile transmissions include digital data signals which are modulated for transmission over the telephone network. After the modulated signals are received at the Computer/Telephony Integrated System, the modulated analog signals are demodulated into the original digital data signals. The demodulated data signals are received by the computer and used by a software application running on the computer system. The modulation of the data signal for transmission and the demodulation of the modulated signal back to the digital data signal are performed by a device known in the art as a modulator/demodulator (modem) which acts as an interface between the telephone line and the computer.

The same telephone line can be used to engage in ordinary voice calls, as well as data or facsimile transmissions. The telephone line is received by a base station which interfaces with both the modem and a voice call handset. The voice call handset can be used to engage in a voice call.

Although the Computer/Telephony Integrated System can handle data and facsimile transmissions as well as voice calls when the base station receives an incoming call the Computer/Telephony Integrated System is unable to distinguish between a data or fax transmission and a voice call. As a result the Computer/Telephony Integrated System by default assumes that the incoming call is a data or fax transmission or assumes that the incoming call is a voice call. If the Computer/Telephony Integrated System assumes that all incoming calls are data or facsimile transmissions, every incoming call will be forwarded to and answered by the modem. This is disadvantageous where the incoming call is a voice call because the modem is unable to recognize voice signals and will subsequently disconnect the call. On the other hand, if the Computer/Telephony Integrated System assumes that all incoming calls are voice calls, each call including data and facsimile transmissions will await an answer by the user. This is disadvantageous because where an incoming data or facsimile transmission is answered by a user, the user will receive an indecipherable stream of modulated signals. Unless the user arranges to have the data or facsimile transmission retransmitted the incoming data or facsimile transmission is lost.

Accordingly it would be advantageous if the Computer/Telephony Integrated System could distinguish between an incoming data or facsimile transmission from a voice call.

SUMMARY OF THE INVENTION

The present invention is directed to a system, method, and apparatus for accepting an incoming call in a Computer/Telephony Integrated System. The incoming call is received by a base station and a computer, and a determination is made whether the incoming call is a voice call or a data or facsimile transmission. Where the incoming call is a voice call, the incoming call is accepted by the base station. Where the incoming call is a data or facsimile transmission, the incoming call is accepted by an application program executed by the computer.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF PRESENTLY PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
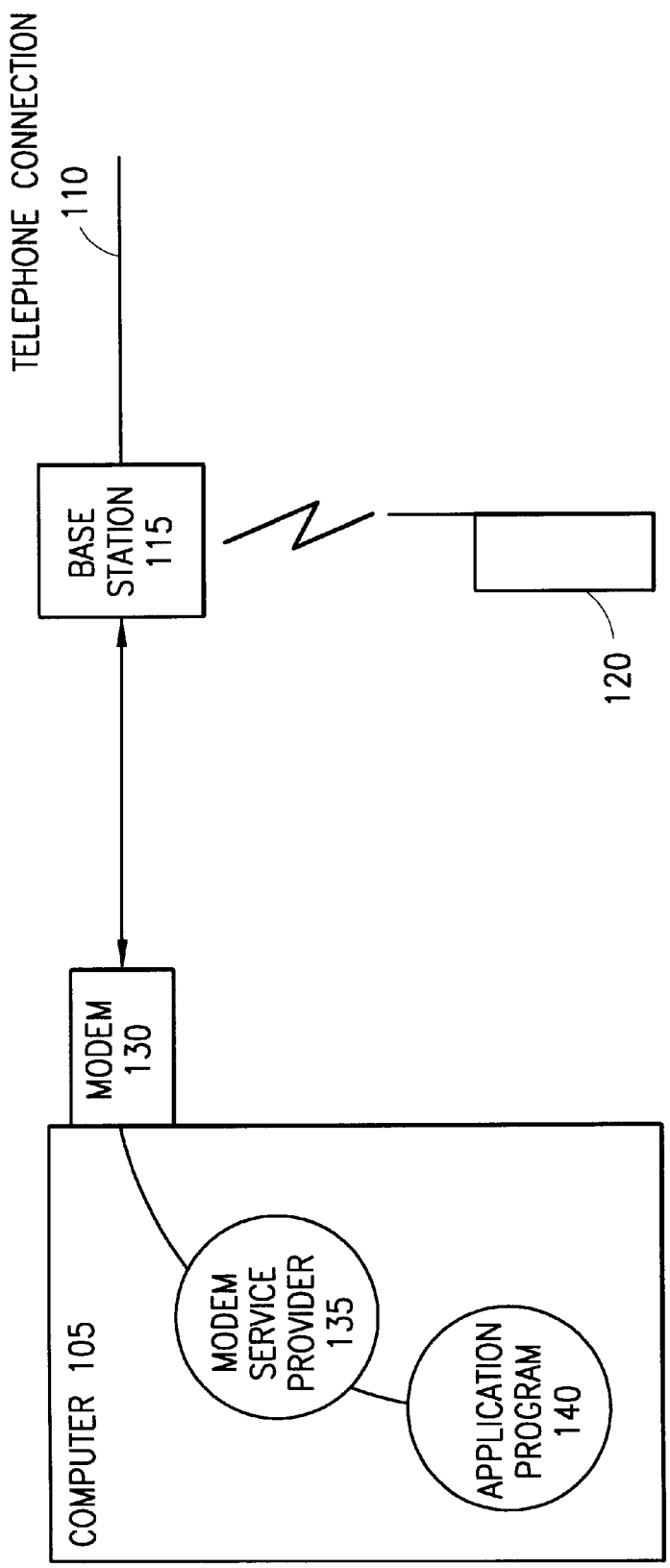
FIG. 1 is a Computer/Telephony Integrated System.

Referring now to FIG. 1, a Computer Telephony Integrated (CTI) System is described. Computer Telephony Integration is a technology which allows a computer 105 to take advantage of a wide range of sophisticated communications features and services over a telephone connection 110 such as receipt and transmittal of a facsimile, or a data transfer. The telephone connection 110 can comprise a land-base phone line in a Public Switched Telephone Network (PSTN), or an Integrated Services Digital Network (ISDN). Although the telephone connection 110 is utilized by the computer for data and facsimile transmission, the phone connection 110 can also be used to engage in ordinary voice calls.

With further reference to FIG. 1, the telephone connection 110 is received by a base station 115. The base station 115 supports use of the telephone connection by both the computer 105 and a voice call handset 120. The voice call handset 120 is used to engage in a voice call while the computer is used for data and facsimile transfers. The base station 115 transmits signals received from the telephone connection 110 over a wireless air interface to the voice call handset 120 and receives signals from the voice call handset for transmission over the telephone connection 110 in a manner well known in the art. Use of the telephone connection by the computer is supported by a data connection 125 between the computer 105 and the base station 115, which allows the computer to access the telephone connection 110.

Data or facsimile transmissions received on a telephone connection 110 are data signals modulated for transmission over the PSTN. Accordingly, the data or facsimile transmission must be demodulated to reconstruct the original data signal. The foregoing is achieved by a Modulator/Demodulator (modem) 130 which acts as an interface between the base station 115 and the computer 105. The reconstructed data signal can then be used by an application program 140 such as a facsimile program, a chat program, or a Web browser.

The modem 130 is a portion of hardware that is either directly connected to the computer 105 or completely integrated therein. The operation of the model 130 is controlled by a software program executed by the computer 100 known as a modem service provider 135. The modem service provider 135 performs various functions such as causing the modem to answer the phone, and disconnecting the phone as well as receiving and forwarding the data signal reconstructed by the modem 130 to the application program 140.

Although the CTI System can handle data and facsimile transmissions as well as voice calls when the base station receives an incoming call the CTI System is unable to distinguish between a data or fax transmission and a voice call. As a result the CTI System by default assumes that the incoming call is a data or fax transmission or assumes that the incoming call is a voice call. If the CTI System assumes that all incoming calls are data or facsimile transmissions every incoming call will be forwarded to and answered by the modem 130. This is disadvantageous where the incoming call is a voice call. On the other hand if the CTI System assumes that all incoming calls are voice calls, each call including data and facsimile transmissions will await an answer by the user. This is disadvantageous because where an incoming data or facsimile transmission is answered by a user, the user will receive an indecipherable stream of modulated signals. Unless the user arranges to have the data or facsimile transmission retransmitted the incoming data or facsimile transmission is lost.

Figure 2:
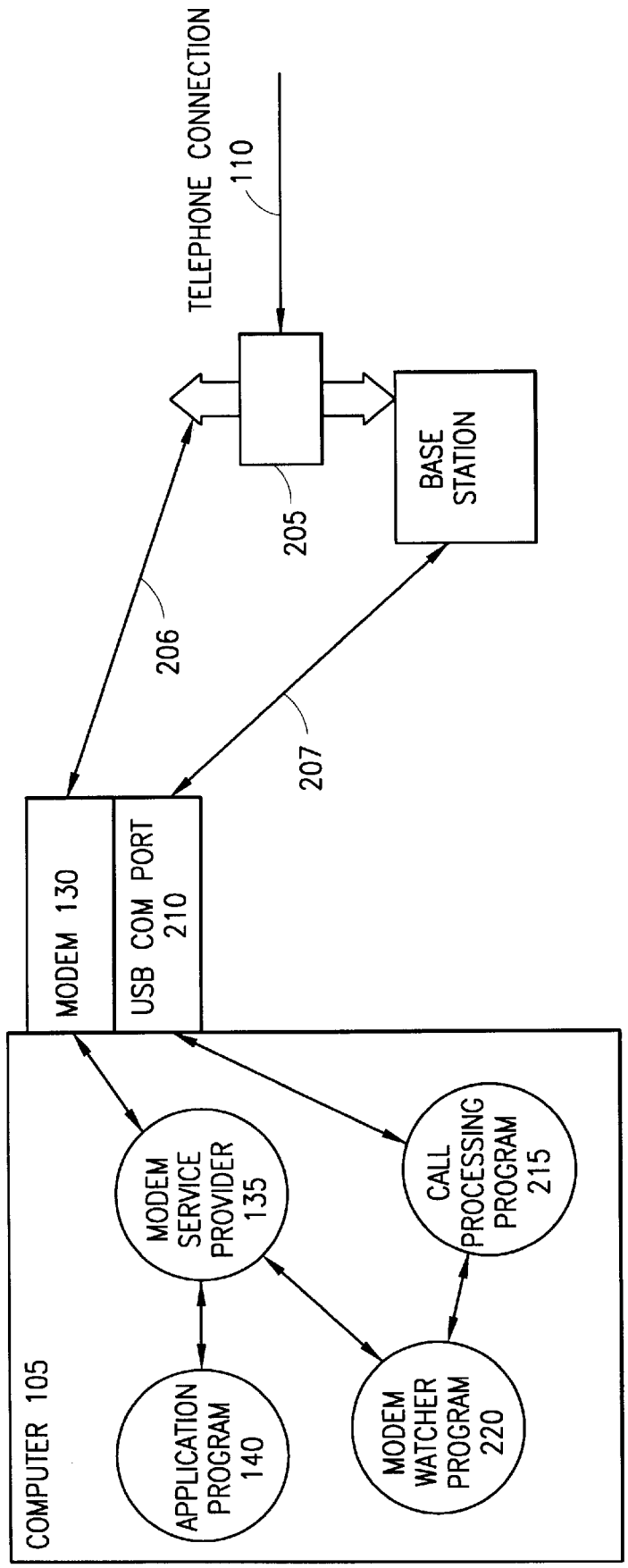
FIG. 2 is an exemplary Computer/Telephony Integrated System embodying the principles of the present invention.

Referring now to FIG. 2 a CTI System embodying the principles of the present invention is described. The telephone connection 110 is received by a Y connection 205 which transmits the incoming call to both the computer 105 and the base station 115. The incoming call is transmitted to the computer 105 via a data connection 206 connecting the Y connection 205 to the modem 130. The Y connection 205 can transmit the incoming call to the base station 115 either via a direct connection or a data connection (not shown) connecting the Y connection 205 and the base station 115. The base station 115 is connected to the computer 105 via a data connection 207 connecting the base station 115 to a universal serial bus communication port (USB) 210 of the computer 105.

The operation of the base station 115 is controlled by a call processing program 215 executed by the computer 105. When an incoming call over the telephone connection 110 is received by the base station 115 through the Y connection 205 the base station 115 sends a signal to the call processing program 215 through the USB 210. The call processing program 215 initially instructs the base station 115 to hold the call until a determination is made whether the incoming call is a voice call or a data or facsimile transmission. If the incoming call is a voice call the call processing program 215 instructs the base station 115 to accept the incoming call. When the base station 115 accepts the incoming call, the base station 115 can alert the user by generating an audible noise. On the other hand if the incoming call is a data or facsimile transmission, the call processing program 215 instructs the base station 115 to forego the incoming call.

A modem watcher program 220 executed by a computer 105 determines whether the incoming call is a voice call or a data or facsimile transmission. Modem watcher program 220 is notified of an incoming call through a path established by the telephone connection 110, the Y connection 205, the data connection 206 connecting the Y connection to the modem 130, the modem, and the modem service provider 135. The modem watcher program 220 responds to an incoming call by requesting the modem service provider 135 to answer the incoming call using the modem 130, and detect the mode of the call. When the incoming call is answered by the modem service provider 135 and the modem 130, the modem service provider 130 receives signals from the incoming call. Based on the signals that the modem service provider 130 receives, the modem service provider 130 can determine whether the incoming call is a voice call or a data or facsimile transmission. Once the foregoing determination is made the modem service provider 130 sends a message to the modem watcher program 220 indicating whether the incoming call is a data or facsimile transmission or a voice call. The modem watcher program 220 informs the call processing program 215 which then instructs the base station 115 to either accept the incoming call or forego the incoming call. If the incoming call is a data or facsimile transmission the modem watcher program 220 requests the application program 140 to accept the data or facsimile transmission by sending a command to the modem service provider 135. To prevent the user from attempting to make an outgoing voice call during the incoming data or facsimile transmission the modem service provider 135 informs the modem watcher program 220 that the telephone connection 110 is in use during the pendency of the data or facsimile transmission. The modem watcher program 220 in turn informs the call processing program 215 which instructs the base station 115 to send a busy signal to the voice call handset 120 if the user attempts to make an outgoing voice call. It is noted that the user is not only limited from making an outgoing voice call during an incoming data or facsimile transmission but is similarly prevented from making an outgoing voice call during an outgoing data or facsimile transmission.

Figure 3:
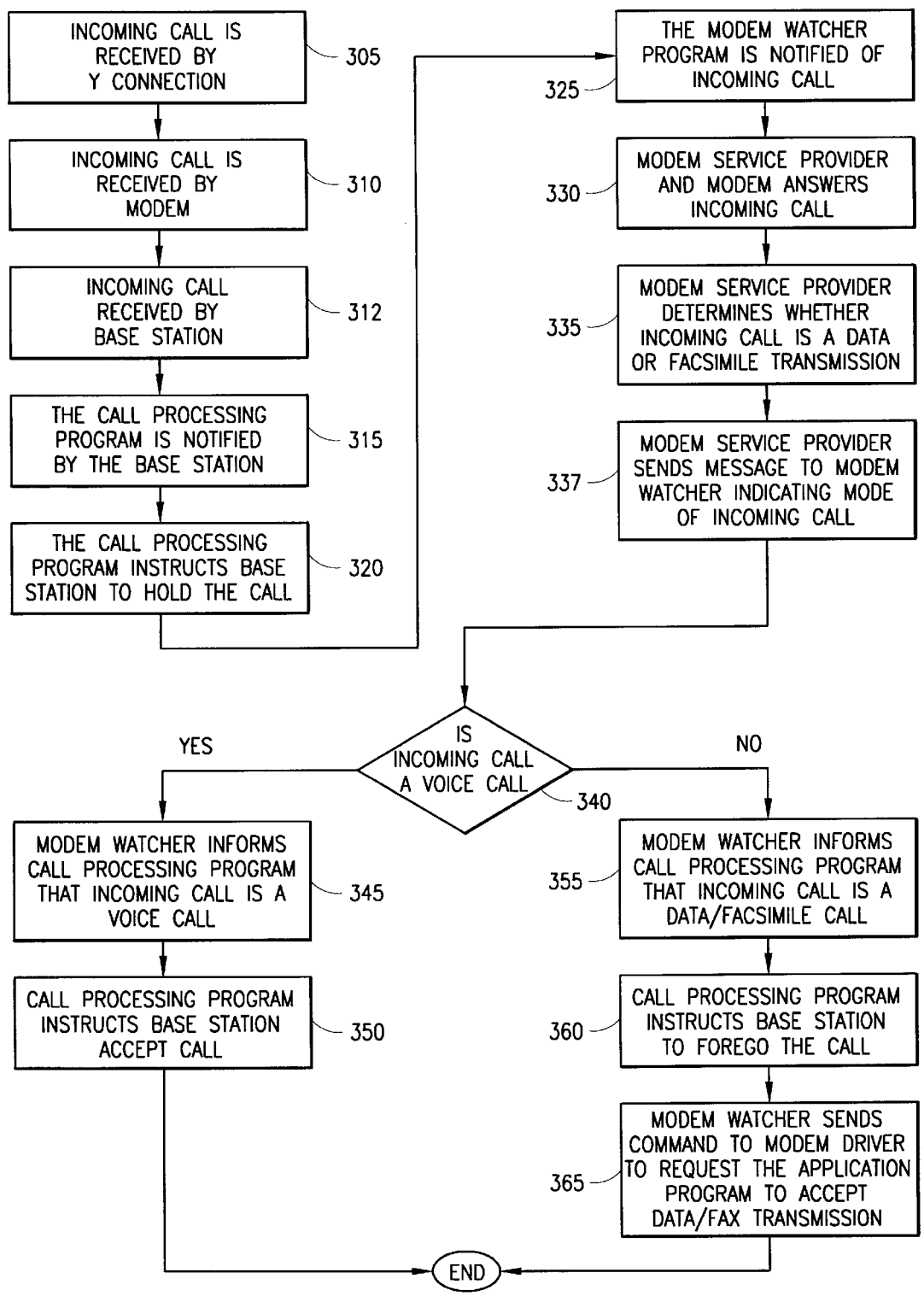
FIG. 3 a flow diagram illustrating the operation of the Computer/Telephony Integrated System in accordance with the principles of the present invention.

Referring now to FIG. 3, a flow diagram illustrating the operation of the CTI System in accordance with the principles of the present invention is described. At step 305 an incoming call is received over the telephone connection 110 by the Y connection 205. The Y connection splits the incoming call into two paths. One path is received by the modem 130 (step 310) while the other path is received by the base station 115 (step 312). At step 315 the call processing program 215 is notified by the base station 115 of the incoming call. The call processing program 215 responds by instructing the base station 115 to hold the call until it is determined whether the incoming call is a voice call or a data or facsimile transmission (step 320). At step 325 the modem watcher program 220 is notified of the incoming call. The modem watcher program 220 responds by instructing the modem service provider 135 to cause the modem 130 to answer the incoming call and detect the mode of the call (step 330). After the incoming call is answered by the modem service provider 135 and the modem 130, the modem service provider can determine whether the incoming call is a voice call or a data or a facsimile transmission based on signals received from the modem 130 (steps 335) and send a message indicating whether the incoming call is a data or facsimile transmission or a voice call (steps 337 and 340).

If the modem watcher program 220 receives a message from the modem service provider 130 indicating that the incoming call is a voice call, the modem watcher program 220 informs the call processing program 215 that the incoming call is a voice call (step 345). The call processing program 215 responds by instructing the base station 115 to accept the call (step 350), thus appropriately handling an incoming voice call.

If on the other hand, the modem watcher program 220 receives a message from the modem service provider 130 indicating that the incoming call is a data or facsimile transmission, the modem watcher program informs the call processing program 215 that the incoming call is a data or facsimile transmission (step 355). The call processing program 215 responds by instructing the base station 115 to forego the call (step 360). At step 365 the modem watcher program 220 sends a command to the modem service provider 135 to request the application program 140 accept the data or facsimile transmission (step 365), thus appropriately handling an incoming data or facsimile transmission.

Figure 4:
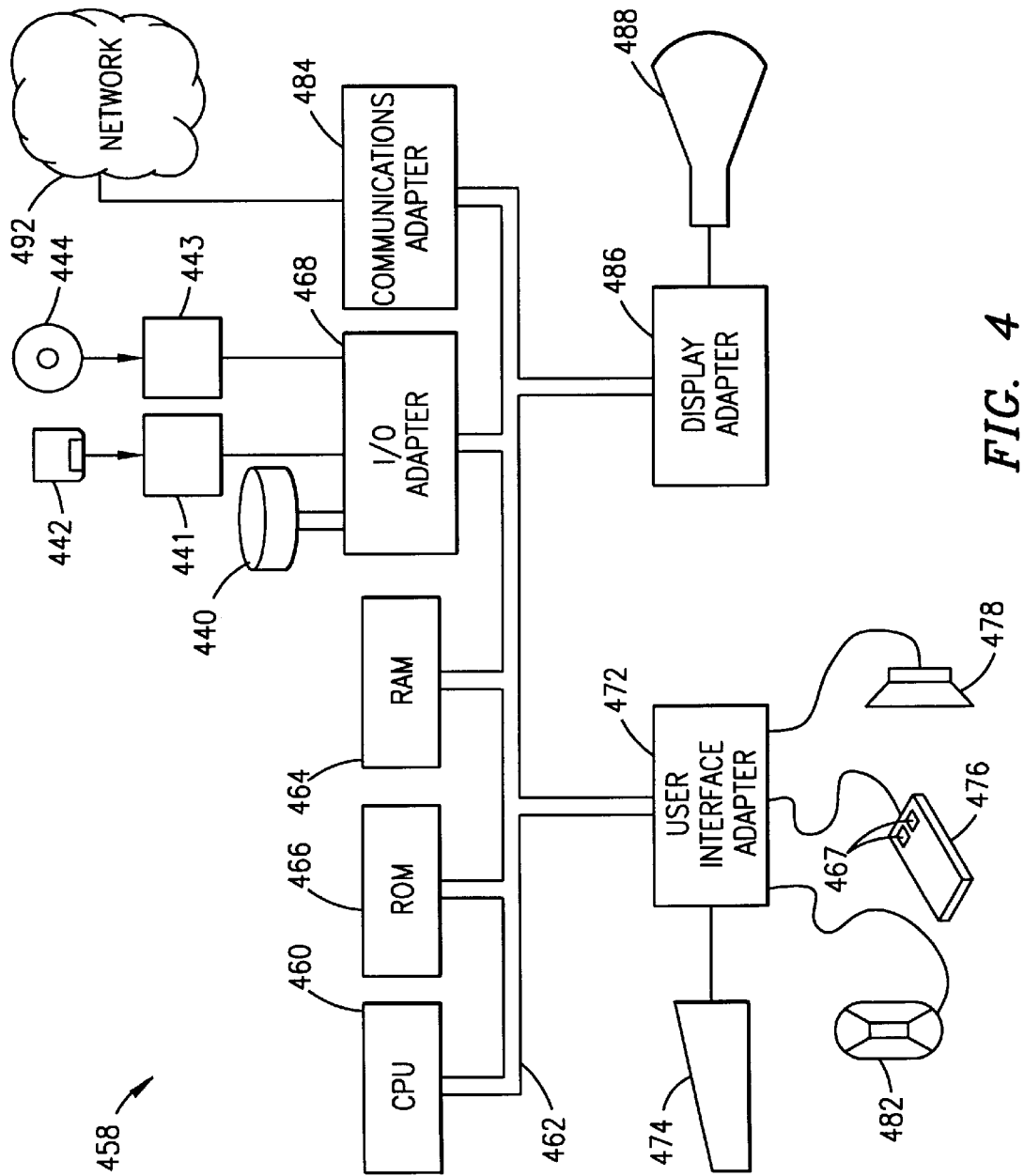
FIG. 4 is a representative hardware environment for practicing the present invention.

Referring now to FIG. 4, there is shown a representative hardware environment for a computer, such as computer 105, for practicing the present invention. A CPU 460 is interconnected via system bus 462 to random access memory (RAM) 464, read only memory (ROM) 466, an input/output (I/O) adapter 468, a user interface adapter 472, communications adapters 484, and a display adapter 486. The input/output (I/O) adapter 468 connects peripheral devices such as hard disc drives 440, floppy disc drives 441 for reading removable floppy discs 442, and optical disc drives 443 for reading removable optical disc 444 (such as a compact disc or a digital versatile disc) to the bus 462. The user interface adapter 472 connects devices such as a keyboard 474, a mouse 476 having a plurality of buttons 467, a speaker 478, a microphone 482, and/or other user interfaces devices such as a touch screen device (not shown) to the bus 462. The display adapter 486 connects a monitor 488 to the bus 462. The communications adapters 484 connect the computer system to a data processing network 492. The data processing network 492 may include any number of other computer systems, such as another computer system 458 or a server, as well as mass storage elements such as another hard disc drive 440, or another optical disc drive 443 for reading optical discs 444.

The call processing program 215 and the modem watcher program 220 can be implemented as sets of instructions resident in the random access memory 464 of one or more computer systems 458 configured generally as described in FIG. 4. Until required by the computer system 458, the set of instructions may be stored in another computer readable memory, for example in a hard disc drive 440, or in removable memory such as an optical disc 444 for eventual use in an optical disc drive 443, or a floppy disc 442 for eventual use in a floppy disc drive 441.

Although the invention has been described with a certain degree of particularity, it should be recognized that elements thereof may be altered by persons skilled in the art without departing from the spirit and scope of the invention. Therefore, the invention is limited only by the following claims and their equivalents.

What is claimed is:

1. In a Computer/Telephony Integrated System comprising a base station and a computer executing an application program, a method for accepting an incoming call, said method comprising the steps of:

receiving said incoming call at said base station;

receiving said incoming call at said computer;

answering said call by said computer;

determining, responsive to said answering step, whether said incoming call is a voice call or a data or facsimile transmission;

alerting, during said determining step, a user of said incoming call when said incoming call is a voice call; and accepting, during said determining step, said incoming call by said application program when said incoming call is data or facsimile transmission.

2. The method of claim 1 further comprising the step of:

temporarily preventing said base station from alerting a use prior to said determining step.

3. A method of claim 1 wherein said answering step further comprises the step of:

answering said incoming call by a modem forming a portion of said computer.

4. The method of claim 1 wherein said answering step further comprises the step of:

answering said incoming call by a modem operably connected to said computer.

5. The method of claim 1 wherein said receiving step further comprises the step of:

transmitting a signal from the base station to the computer responsive to receiving said incoming call.

6. The method of claim 5, wherein said transmitting step further comprises the step of:

transmitting a signal from the base station to a universal serial bus port forming a portion of said computer.

7. An article of manufacture comprising a computer usable medium having computer readable program code means embodied thereon for accepting an incoming call in a Computer/Telephony Integrated System comprising a base station and a computer executing an application program, the computer readable code means in said article of manufacture comprising means for:

receiving said incoming call at said computer;

answering said call at said computer;

determining whether said incoming call is a voice call or a data or facsimile transmission, responsive to said answering said call;

causing said base station to alert a user of said incoming call wherein said determining means determines said incoming call is a voice call; and causing said application program to accept said incoming call wherein said determining means determines said incoming call is a data or facsimile transmission.

8. The article of manufacture of claim 7 wherein the computer readable code means further comprises means for:

temporarily preventing said base station from alerting a user prior to said determining whether said incoming call is a voice call or a data, or a facsimile transmission by said determining means.

9. The article of manufacture of claim 7 wherein said means for answering further comprises means for:

answering said incoming call by a modem forming a portion of said computer.

10. The article of manufacture of claim 7 wherein said means for answering further comprises means for:

answering said incoming call by a modem operably connected to said computer.

11. The article of manufacture of claim 7 wherein said receiving means further comprises means for:

receiving a signal from said base station responsive to said base station receiving said incoming call.

12. A system for accepting an incoming call in a Computer/Telephony Integrated System comprising a base station and a computer executing an application program, said system comprising:

means for receiving said incoming call at said base station;

means for receiving said incoming call at said computer;

means for determining whether said incoming call is a voice call or a data or facsimile transmission;

means for answering said call by said computer;

means for alerting a user of said incoming call by said base station wherein said determining means determines that said incoming call is a voice call; and means for accepting said incoming call by said application program wherein said determining means determines that said incoming call is data or facsimile transmission.

13. The system of claim 12 wherein said means for receiving said incoming call at said base station and said means for receiving said incoming call at said computer further comprises:

a Y-connector for receiving said incoming call.

14. The system of claim 13 wherein said Y-connector is connected to said base station and said computer.

15. The system of claim 13 wherein said means for receiving said incoming call at said computer further comprises:

a data connection connecting said base station to said computer.

16. The system of claim 15 wherein said data connection is connected to a universal serial bus forming a portion of said computer.

17. The system of claim 12 wherein said means for answering said call by said computer further comprises:

a modem forming a portion of said computer.

18. The system of claim 12 wherein said means for answering said call by said computer further comprises:

a modem operably connected to said computer.

* * * * *